United States Patent
Hansmann et al.

(10) Patent No.: US 10,663,029 B2
(45) Date of Patent: May 26, 2020

(54) DEVICE AND METHOD FOR INFLUENCING A DYNAMIC PROPERTY OF AT LEAST ONE MOVABLY MOUNTED BODY AND USE THEREOF AS A VARIABLY ADJUSTABLE DAMPING ELEMENT

(71) Applicant: Fraunhofer-Gesellschaft zur Foerderung der angewandten Forschung e.V., Munich (DE)

(72) Inventors: Jan Christoph Hansmann, Darmstadt (DE); Stefan Wolter, Ginsheim Gustavsburg (DE); Bjoern Seipel, Florstadt (DE); William Kaal, Darmstadt (DE); Sven Herold, Jahnstr. (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 107 days.

(21) Appl. No.: 15/752,098

(22) PCT Filed: Aug. 12, 2016

(86) PCT No.: PCT/EP2016/069239
§ 371 (c)(1),
(2) Date: Feb. 12, 2018

(87) PCT Pub. No.: WO2017/029217
PCT Pub. Date: Feb. 23, 2017

(65) Prior Publication Data
US 2018/0238415 A1    Aug. 23, 2018

(30) Foreign Application Priority Data
Aug. 14, 2015    (DE) .......... 10 2015 215 554

(51) Int. Cl.
*F16F 15/02*    (2006.01)
*B60K 5/12*    (2006.01)
*F16F 13/30*    (2006.01)

(52) U.S. Cl.
CPC .......... *F16F 15/022* (2013.01); *B60K 5/1283* (2013.01); *F16F 13/30* (2013.01);
(Continued)

(58) Field of Classification Search
CPC .......... F16F 1/041; F16F 1/3615; F16F 13/30; F16F 13/26; F16F 15/022; B60G 2202/41;
(Continued)

(56) References Cited

U.S. PATENT DOCUMENTS 5,303,155 A * 4/1994 Kallenbach .......... B60G 17/018
  280/5.5
5,730,429 A * 3/1998 Ivers .................. F16F 1/3605
  267/140.14

(Continued)

FOREIGN PATENT DOCUMENTS

DE    3721811 A1    1/1989
DE    199 58 178 C1    11/2000
(Continued)

OTHER PUBLICATIONS

International Search Report for PCT/EP2016/069239 dated Nov. 8, 2016; English translation submitted herewith (5 pages).

*Primary Examiner* — Thomas W Irvin
(74) *Attorney, Agent, or Firm* — Fitch, Even, Tabin & Flannery LLP

(57) ABSTRACT

A device and a method for influencing a dynamic property of at least one movably mounted body of two bodies coupled mechanically at least via a variably adjustable stiffness along a first force path. The invention includes a damping element (Continued)

with constant damping properties directly or indirectly coupled in series with the variably adjustable stiffness along the first force path Both bodies are mechanically directly or indirectly coupled via a second force path running parallel to the first force path along which at least one adjustable stiffness is incorporated. The damping property of the damping element and the adjustable stiffnesses are coordinated and configured so that a damping property assigned to the device for mechanical coupling can be varied exclusively by the adjustable stiffnesses.

22 Claims, 3 Drawing Sheets

(52) U.S. Cl.
CPC .... *B60G 2202/41* (2013.01); *B60G 2400/206* (2013.01); *B60G 2500/2014* (2013.01)

(58) Field of Classification Search
CPC ...... B60G 2400/206; B60G 2500/2014; B60G 17/021; B60K 5/1283
See application file for complete search history.

(56) References Cited

U.S. PATENT DOCUMENTS

| | | | | |
|---|---|---|---|---|
| 7,398,143 | B2* | 7/2008 | Stothers | G05D 19/02 267/136 |
| 7,631,736 | B2* | 12/2009 | Thies | B60G 17/0272 188/380 |
| 8,091,694 | B2* | 1/2012 | Vervoordeldonk | B60G 13/16 188/378 |
| 9,739,353 | B2* | 8/2017 | Kraus | F16H 21/44 |
| 2004/0245689 | A1 | 12/2004 | Loheide et al. | |
| 2013/0180350 | A1 | 7/2013 | Kraus et al. | |

FOREIGN PATENT DOCUMENTS

| | | |
|---|---|---|
| DE | 102 14 325 A1 | 10/2003 |
| DE | 10 2008 057 577 A1 | 5/2010 |
| DE | 10 2009 015 166 A1 | 9/2010 |
| DE | 10 2009 047 134 A1 | 5/2011 |
| EP | 2 615 325 A1 | 7/2013 |
| WO | 02/087909 A1 | 11/2002 |
| WO | 2009/064640 A1 | 5/2009 |

* cited by examiner

DEVICE AND METHOD FOR INFLUENCING A DYNAMIC PROPERTY OF AT LEAST ONE MOVABLY MOUNTED BODY AND USE THEREOF AS A VARIABLY ADJUSTABLE DAMPING ELEMENT

CROSS REFERENCE TO RELATED APPLICATIONS

Reference is made to International Application No. PCT/EP2016/069239 filed Aug. 12, 2016, and German Application No. 10 2015 215 554.4 filed Aug. 14, 2015, which are incorporated herein by reference in their entirety.

BACKGROUND OF THE INVENTION

Field of the Invention

The invention relates to a device and a method for mechanical coupling of an oscillatingly mounted body along a first force path, along which at least one variably adjustable stiffness is incorporated with a resting body and further, a use of the preceding device as an element with variably adjustable damping and stiffness properties.

Description of the Prior Art

Generic devices are preferably used as mechanical bearings in mechanical engineering, vehicle and device construction and as a result of their dynamic properties are able to influence the movement or vibration behavior of a movably mounted body which is mechanically coupled via the bearing to at least one second body. The term "movably mounted body" is to be understood as any components, component groups, structures or components which are usually movably or preferably oscillatingly mounted on a resting support structure which correspond to the second body. For the purposes of influencing the movement of at least the movably mounted body, the bearing has damping properties by which the body movement of the movable body is braked by a force directed contrary to its direction of movement. This force is dependent on the relevant movement velocity of both the bodies coupled mechanically to one another via the bearing and is able to extract energy from the two-body system moving relative to one another, whereby energy is dissipated. Depending on the technically constructive configuration of the damping bearing, the appearing damping effect is based on different physical mechanisms of action such as, for example the friction between surfaces or inside a fluid or inside elastomer materials to mention just a few damping effects.

In addition to the damping bearing properties of a mechanical coupling between two bodies, the mechanical coupling can additionally be characterized by its stiffness which describes the resistance against an elastic deformation of the mechanical coupling. The stiffness causes a restoring force which is dependent on the elastic properties of the mechanical coupling starting from an externally acting force.

For the description and influencing of all the dynamic properties of a body which is movably mounted via a mechanical coupling, it is therefore necessary to take into account both the stiffness and also damping properties of the mechanical coupling. Depending on the configuration of the mechanical coupling, damping or stiffness properties can dominate.

If for example two bodies are interconnected via a mechanical cantilever, there is no doubt that the mechanical coupling is substantially characterized by the stiffness of the cantilever. Although these cantilevers fundamentally also have damping properties, these only appear to a very small extent, for example, due to material-inherent friction effects during deformation of the cantilever or due to the air resistance to which the oscillating cantilever is exposed. Also a possible sound emission can contribute to the vibration damping.

Compared with this for example, in a hydraulic damper which typically provides two chambers communicating fluidically via a throttle opening which are partially filled with a hydraulic fluid, the damping properties dominate compared with the stiffness which is nevertheless inherent to the damper system, which is constructively due to the components and the stiffness inherent to the fluid.

The further considerations and explanations are directed towards a mechanical coupling between two bodies whose dynamic coupling properties are dominated by the damping compared with a system-inherent coupling stiffness.

As already explained initially, mechanical couplings between two bodies designed as damping elements can be characterized by a velocity-dependent force by which kinetic energy is extracted from the relatively movable bodies interconnected via the damping element, with the result that ultimately the movable one in each case is brought to rest with respect to the body mounted at rest.

Depending on the intended use of the mechanically coupled body, it can be advantageous to change the relationship between the damping force and the movement velocity, that is to variably adjust the damping properties.

Damping elements with a variably adjustable damping characteristic are formed for example by hydraulic or pneumatic damping elements known per se which include a channel through which fluid flows whose channel cross-section is variably adjustable. DE 3721811 A1 in this connection discloses an engine bearing with hydraulic damping in which a separating wall is arranged between two liquid-filled chambers which has a throttle opening. In the area of the throttle opening there is additionally provided a perforated screen whose opening width is adjustable between a minimum dimension and a maximum dimension use of a signal-actuatable adjusting device.

Another principle for variable adjustment of the damping is disclosed in DE 102 14 325 A1 which describes a hydraulic bearing which provides two separate fluid chambers which are fluidically interconnected via a so-called overflow channel. Along the overflow channel a magnetic-force-assisted, bidirectionally deflectable magnetic piston arrangement is provided, which, depending on the deflection, may exert an additional force effect along the, to a first approximation, incompressible fluid inside the overflow channel whereby the damping properties of the hydraulic bearing can be actively influenced.

All the fluid-containing damping systems require an increased constructive and cost-relevant expenditure due to necessary fluidic sealing measures. In addition, such fluid-based damping elements are subjected to an increase in the dynamic stiffness with increasing vibration frequencies of the body acting on the damping system which is movable by being mounted to oscillate.

Furthermore, fluid-based damping elements are known whose damping properties are adjustable by varying the viscosity of the fluid and associated with this the flow resistance of a fluid enclosed by a chamber system. For this purpose, electrorheological or magnetorheological fluids are used whose viscosity is variable by interaction with electric or magnetic fields. In addition to the already-mentioned constructive expenditure on account of the fluid-dependent sealing, electrorheological and magnetorheological fluids additionally have the problem of sedimentation of electrically conductive or magnetic particles. In addition, here also there is the problem of the increase in the dynamic stiffness towards high oscillation frequencies.

In a technical article by Heiβing et al., Fahrwerkhandbuch, 4th edition, 2013, p. 75 ff, ISBN 978-3-658-01991-4, designs for a vibration damper for motor vehicles are described which have a goal of an optimum compromise between hard safety damping and soft comfort damping for a damper design. For this purpose the wheel suspension is connected to the body via two separate force paths which along a first force path a damper element is arranged in series with the wheel and along the second force path a spring stiffness is provided.

EP 2 615 325 A1 describes an active bearing which provides two parallel force paths between two bodies. Along the first force path are provided an adjustable elastically deformable element, a transmission unit and a linear actuator in a serial sequence, which are arranged parallel to the second force path along which an elastic supporting element is located.

DE 10 2009 047 134 A1 discloses a wheel suspension for a vehicle with a spring system arranged between a vehicle wheel and the vehicle body, which has a spring element whose spring stiffness is adjustable by an adjusting device.

DE 10 2009 015 166 A1 describes an adaptive assembly bearing for motor vehicles for variation in the damping and stiffness thereof. Actuators are provided both for adjusting damper units and also stiffnesses.

DE 10 2008 057 577 A1 discloses an elastomer bearing with a spring/damper body whose expandability can be influenced by the action of at least one supporting body.

SUMMARY OF THE INVENTION

The invention has the goal of developing a device for mechanical coupling of an oscillatingly mounted body along a first force path, along which at least one variably adjustable stiffness is incorporated with a body at rest in such a manner that the dominating damping properties of the coupling mechanically connecting the two bodies should be variable, to be individually adjustable, with respect to the stiffness of the mechanical coupling. The damping behavior adjusted in each case should remain constant or largely constant over a large frequency range, in particular at high frequencies. The device according to the invention is mechanically simple, cost-effective and as easy to maintain as possible so that in particular fluid-based damping systems should be eliminated.

The device according to the invention for influencing a dynamic property of at least one movably mounted body of two bodies mechanically coupled via a variably adjustable stiffness along a first force path includes a damping element with constant damping properties directly or indirectly coupled in series with the variably adjustable stiffness along the first force path. Both bodies are mechanically directly or indirectly coupled via a second force path running parallel to the first force path along which at least one adjustable stiffness is incorporated, wherein the damping property of the damping element and the adjustable stiffnesses are coordinated with one another and configured in such a manner that a damping property assigned to the device for mechanical coupling can be varied exclusively by the adjustable stiffnesses.

The variably adjustable stiffness arranged in each case along the first and second force path is preferably implemented exclusively using a purely mechanical coupling system so that no sealing problems exist such as are present in the previously explained fluid-based hydraulic or pneumatic elements with dynamic properties. This opens up the new type of possibility of a variably adjustable damping system whose damping behavior is variably adjustable exclusively by varying a variably adjustable stiffness.

In a preferred embodiment if an elastomer is used as a damping element, the device according to the invention has a variably adjustable damping whose damping behavior qualitatively largely corresponds to that of an elastomer. That is the damping behavior remains largely constant at a predefined damping even when oscillation frequencies of the oscillatingly mounted body vary at higher frequencies. In other words, the device according to the invention simulates in an almost ideal manner the largely frequency-independent damping characteristic of an elastomer, wherein the degree of damping is variably adjustable with the assistance of the variably adjustable stiffnesses without any variation of the damping elements contained in the device. As the following explanations with reference to specific exemplary embodiments show, the device according to the invention has a variably adjustable damping behavior. That is the damping or the loss angle remains constant over a large frequency range after corresponding setting of a specific damping value or degree of damping. This is also designated as a loss angle.

The finding according to the invention which forms the basis of the previously explained device is also reflected in the method according to the invention for influencing the dynamic property of at least one movably mounted body of two bodies mechanically coupled at least via a variably adjustable stiffness along a first force path in which at least one damping element which influences the dynamic properties of the mechanical coupling along the at least one force path is incorporated or along at least one second force path which mechanically couples the two bodies to one another, having damping properties that dominate the dynamic properties of the mechanical coupling. This is, a mechanical coupling between the first and second body can be predominantly characterized by damping properties. According to the invention the at least one damping element is not used to influence the damping behavior and exclusively the stiffness along the one force path is varied to variably influence the damping properties of the mechanical coupling.

For this reason, the mechanical coupling configured according to the invention between the two bodies which are mounted movably relative to one another is suitable as a variably adjustable damping element whose damping behavior is adjustable in a predefinable manner by varying the variably adjustable stiffness.

Further details can be deduced from the further description with reference to the following exemplary embodiments.

DETAILED DESCRIPTION OF THE INVENTION

Figure 1:
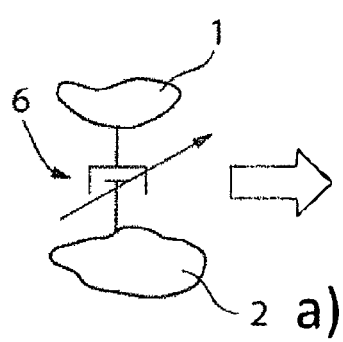
FIGS. 1 *a, b* show schematic views of a circuit topology for a damping system with variably adjustable damping.
Figure 1:
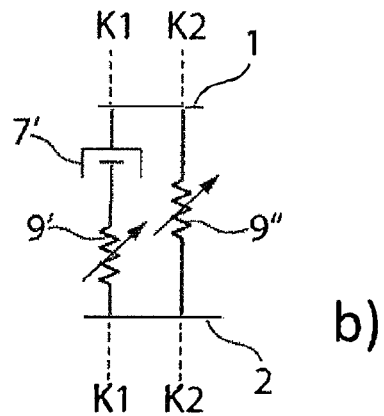

FIG. 1a illustrates a mechanical coupling topology between two bodies 1 and 2, wherein the mechanical coupling is characterized by damping properties. That is the damping effect dominates over the stiffness which is also inherent to the mechanical coupling.

In addition, the coupling system is characterized by variably adjustable dynamic properties. That is the coupling system has variably adjustable damping properties which are illustrated by the arrow in the damping system 6. It is additionally assumed that the body 1 is oscillatingly mounted with respect to the resting body 2.

In the embodiment illustrated in FIG. 1b to which reference is made subsequently multiple times, both bodies 1 and 2 are mechanically coupled via two force paths K1 and K2. A first damping element 7' is provided along the first force path K1 which is coupled in series with a variably adjustable stiffness 9'. A unit having dynamic properties in the form of a variably adjustable stiffness 9" is provided along the second force path K2. As a result of the variably adjustable stiffness 9" incorporated along the second force path K2, compensations can be made in relation to the variable stiffness behavior of the adjustable stiffness 9' arranged along the first force path, by which the damping behavior of the mechanical coupling between two bodies is variably adjustable.

The illustrated coupling topology is based on the principle that its dominant damping properties are variably adjustable in a predefinable manner by exclusive variation of at least one variably adjustable stiffness 9' or 9" incorporated in the coupling topology. The damping element 7' has constant damping properties and is preferably formed from an elastomer body or from a damping unit having at least one elastomer body.

The particular feature of the explained damping topology is in that its resulting damping properties qualitatively correspond to those of the damping element that is used. However the dampening properties are quantitatively adjustable in magnitude without varying the stiffness properties of the coupling topology. A largely independent adjustment of stiffness and damping properties is made possible. If for example an elastomer is used as damping unit or a damping unit is used having at least one elastomer body, it becomes possible to maintain the frequency-independent damping properties of the elastomer over a wide range for the entire coupling topology. At the same time an independent adjustment of stiffness and loss angle is enabled.

Figure 2:
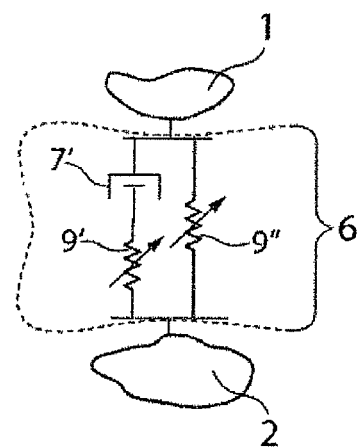
FIG. 2 shows the circuit topology for a preferred exemplary embodiment for a device with variably adjustable damping.

FIG. 2 illustrates the preferred embodiment according to FIG. 1b in detail. The movably or oscillatingly mounted body 1 as well as the preferably resting mounted body 2 are interconnected or coupled via the variably adjustable damping system 6 according to the invention. The damping system 6, which is variably adjustable in its damping properties provides, two series-connected elements which interconnect both bodies 1 and 2 along the first force path K1 which namely are a damping element 7' and an adjustable stiffness 9'. A stiffness element 9" in path K2 is additionally arranged in parallel to the first force path K1, whose stiffness is adjustable or variable. The adjustable stiffness elements 9' and 9" are each characterized by a lower and by an upper limit of their stiffness adjustment range, and are dependent on the embodiment of the adjustable stiffness elements 9' and 9" used and their design. The variability of the stiffness is variable according to the constructive design of the stiffness, that is adjustable continuously or in discrete steps or stages.

A preferred embodiment for the variably adjustable stiffness 9" is disclosed in DE 10 2011 015 798 B4. The known variably adjustable stiffness couples two components, a first and a second component along at least one direction of action, along which at least one component is oscillatingly mounted and has a surface element with a surface upper and a surface lower side as well as a surface longitudinal extension which is dimensionally stable in and elastic lateral to the surface longitudinal extension. Contacts in which n≥2 are attached to the first component in a spatially fixed manner, via which the first component comes in contact at n≥2 first contact points with the surface underside and/or surface upper side of the surface element. Likewise n≥2 contacts are attached to the second component in a spatially fixed manner via which the second component comes in contact at n≥2 second contact points with the surface underside and/or surface upper side of the surface element. Both components are arranged rotatably relative to one another about a spatial axis oriented orthogonally to the surface longitudinal extension which coincides with the at least one direction of action along which at least one component is oscillatingly mounted so that during rotation the surface stiffness of the surface element is variable.

The adjustable damping system 6 configured according to the invention exhibits both a distance-dependent, that is an elastic and also velocity-dependent, damping and dynamic behavior wherein the velocity-dependent damping behavior dominates. In principle, it is possible to use the adjustable damping system 6 also as a damped element with adjustable stiffness which is explained in FIG. 3b.

Figure 3A:
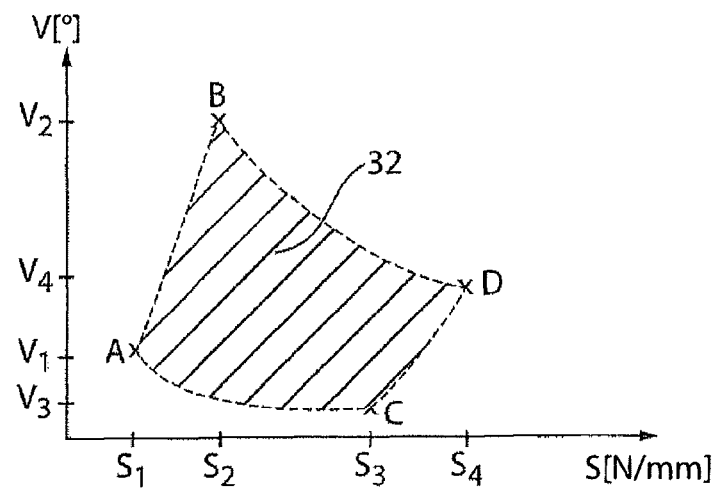
FIGS. 3a and b show diagrams to illustrate the damping behavior.

The damping behavior, which is also characterized in terms of the so-called loss angle as well as the stiffness behavior, are illustrated for the damping system 6 configured according to the invention in the diagrams illustrated in FIGS. 3a and b. The stiffness [N/mm] (S) is plotted along the abscissa, the loss angle [°] (V) along the ordinate.

FIG. 3a shows a surface 32 which characterizes the entire adjustment range of the adjustable damping system 6. This is spanned by the four corner points A, B, C and D. At the corner point A, the adjustable damping system 6 has the stiffness S1 and the loss angle V1. At the corner point B, the adjustable damping system 6 has the stiffness S2 and the loss angle V2. At the corner point C, the adjustable damping system 6 has the stiffness S3 and the loss angle V3. At the corner point D, the adjustable damping system 6 has the stiffness S4 and the loss angle V4. Corner point A is established when the adjustable stiffness elements 9' and 9" are each adjusted to their minimal possible stiffness. If the stiffness element 9" is now left at its minimal possible stiffness and the stiffness element 9' is adjusted to its maximum possible stiffness, for the adjustable damping system 6 the properties are established at the corner point B. If the stiffness element 9' is now left at its maximum possible stiffness and the stiffness element 9" is adjusted to its maximum possible stiffness, for the adjustable damping system 6 the properties are established at the corner point D. If the stiffness element 9″ is now left at its maximum possible stiffness and the stiffness element 9′ is adjusted to its minimum possible stiffness, for the adjustable damping system 6 the properties are established at the corner point C. If the property of only one adjustable stiffness element 9′ or 9″ is varied, the stiffness and damping properties of the adjustable damping system 6 vary depending on one another.

Figure 3B:
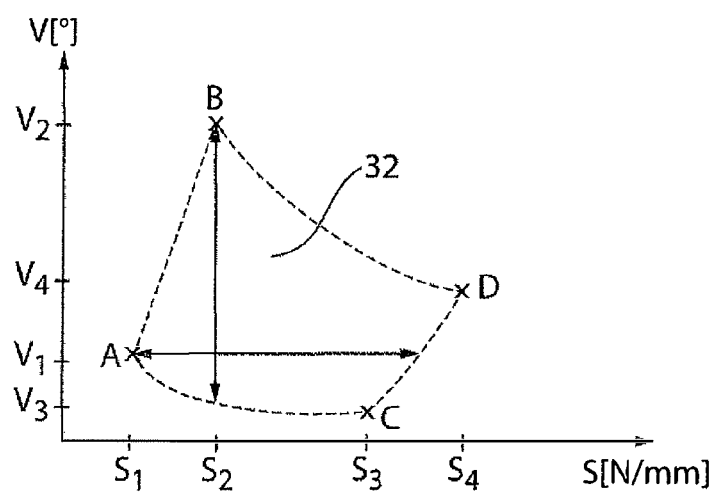

FIG. 3b shows a surface 32 which characterizes the entire adjustment range of the adjustable damping system 6 and additionally illustrates two examples for the independent adjustment of the stiffness and damping properties. If the properties of the two adjustable stiffness elements 9′ and 9″ are varied jointly starting from the corner point B, it is possible to adjust the damping of the adjustable damping element 6 with constant stiffness S2. If the properties of the two adjustable stiffness elements 9′ and 9″ are varied jointly starting from the corner point A, it is possible to adjust the damping of the adjustable damping element 6 with constant loss angle V1.

Figure 4:
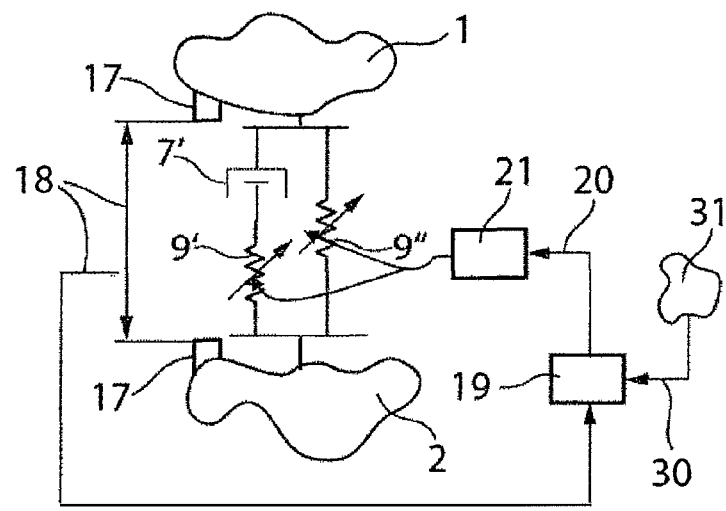
FIG. 4 shows a circuit topology of a device according to the invention with distance-sensor-based closed loop control.

The adjustable damping system configured according to the invention is, according to the exemplary embodiment in FIG. 4, advantageously combined with a closed-loop control by which the stiffnesses 9′ and 9″ can be adjusted by actuators with the result that the damping behavior and the stiffness behavior of the adjustable damping system can be regulated. A sensor system 17 is provided for the sensor recording of the displacements of the bodies 1 and 2 mounted movably or oscillatingly with respect to one another, by which it is possible to record the adjustment travel, the velocity and/or the acceleration between the two bodies 1, 2. The sensor system 17 is connected to a regulating unit 19 which in turn is connected to an actuator 21 for adjustment of the adjustable stiffnesses 9.

The sensor system 17 records for example a displacement 18 between two bodies 1, 2. The relative acceleration values or velocity values between two bodies 1, 2 are actual values which can be recorded by sensors are taken as the basis for the regulator 19. The comparative desired value required for the regulation can be specified within the regulator 19 or be provided as desired signal 30 from an origin 31, for example in the form of a closed loop system or an open loop control.

Figure 5:
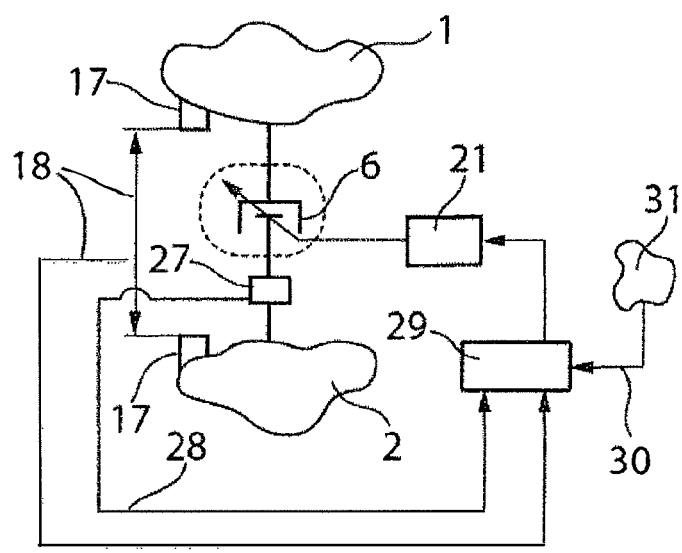
FIG. 5 shows circuit topology as FIG. 5 supplemented by a sensor force measurement.

FIG. 5 shows an advantageous addition to the exemplary embodiment illustrated in FIG. 4 with closed loop control system. In addition, the exemplary embodiment illustrated in FIG. 5 provides an additional force measurement sensor 27 which is connected in series between the bodies 1 and 2 with the damping system 6 configured according to the solution. The displacement 18 recorded with the aid of the distance measurement sensor 17 and the force signal 28 recorded with the aid of the force measurement sensor 27 are fed to a regulator 29 which are both the basis for the determination both of the stiffness and of the loss angle of the adjustable damping element. The stiffness determined in this way and also the determined loss angle are adapted with the aid of the regulator 29 to a desired signal 30 which is provided from an origin 31, for example in the form of another closed loop control system or open loop control.

REFERENCE LIST

1 First body
2 Second body
6 Adjustable damping element
7′ Damping element
9′ and Variably adjustable stiffness
9″
17 Distance sensor
18 Displacement
19 Regulator
20 Regulating signal
21 Actuator
27 Force measurement
28 Force signal
29 Regulator
30 Desired signal
31 Origin
32 Surface

The invention claimed is:

1. A mechanical coupling device comprising:
a body which is mounted to oscillate along a first force path, the first force path including at least one variable adjustable stiffness;
a resting body;
a damping element including constant damping properties coupled in series with at least the at least one variable adjusted stiffness;
the oscillating body and the resting body being mechanically coupled exclusively together by a mechanical coupling along a second force path with the second force path being in parallel with the first force path; and
the constant damping properties of the damping element and the at least one variable adjustable stiffness being coordinated together and are configured so that the constant damping properties of the mechanical coupling device are variable exclusively by mechanical adjustment of the at least one variable adjustable stiffness.

2. The device according to claim 1, wherein:
the damping element is mechanically coupled to the at least one variably adjustable stiffness along the first force path by a first rigid connecting structure.

3. The device according to claim 2, wherein:
the at least one variably adjustable stiffness are adjustable in either discrete stiffness steps or continuously.

4. The device according to claim 3, wherein:
the at least one variably adjustable stiffness includes an actuator which varies stiffness.

5. The device according to claim 4, comprising:
a sensor for recording a relative position change which is positioned between the bodies and a closed-loop or open-loop control which activates an actuator which is responsive to a position change recorded by the sensor between the bodies.

6. The device according to claim 5, comprising:
a force sensor between the bodies which records a sum of forces acting along the first and second force paths and a closed-loop or open-loop control activates the actuator in response to a position change recorded by the sensor between the bodies and a desired value.

7. The device according to claim 2, wherein:
the variably adjustable stiffnesses include an actuator which varies stiffness.

8. The device according to claim 7, comprising:
a sensor for recording a relative position change which is positioned between the bodies and a closed-loop or open-loop control which activates an actuator which is responsive to a position change recorded by the sensor between the bodies.

9. The device according to claim 8, comprising:
a force sensor between the two bodies which records a sum of forces acting along the first and second force paths and a closed-loop or open-loop control activates the actuator in response to a position change recorded by the sensor between the bodies and a desired value.

10. The device according to claim 1, wherein:
the at least one variably adjustable stiffness are adjustable in either discrete stiffness steps or continuously.

11. The device according to claim 10, wherein:
the at least one variably adjustable stiffness includes an actuator which varies stiffness.

12. The device according to claim 11, comprising:
a sensor for recording a relative position change which is positioned between the bodies and a closed-loop or open-loop control which activates an actuator which is responsive to a position change recorded by the sensor between the bodies.

13. The device according to claim 12, comprising:
a force sensor between the two bodies which records a sum of forces acting along the first and second force paths and a closed-loop or open-loop control activates the actuator in response to a position change recorded by the sensor between the bodies and a desired value.

14. The device according to claim 1, wherein:
the at least one variably adjustable stiffness includes an actuator which varies stiffness.

15. The device according to claim 14, comprising:
a sensor for recording relative position change which is positioned between the bodies and a closed-loop or open-loop control which activates an actuator which is subject to a position change recorded by the sensor between the bodies.

16. The device according to claim 15, comprising:
a force sensor between the bodies which records a sum of forces acting along the first and second force paths and a closed-loop or open-loop control activates the actuator in response to a position change recorded by the sensor between the bodies and a desired value.

17. The device according to claim 1, wherein:
the damping element is configured with dynamic properties which are dependent on velocity and distance.

18. The device according to claim 1, wherein:
the damping element is an elastomer.

19. The device according to claim 1, wherein:
the at least one variably adjustable stiffness along the second force path comprises at least an elastically deformable spring element having a variably adjustable spring stiffness.

20. The device according to claim 1, comprising:
a variably adjustable damping element located between the bodies which are mounted to be moveable relative to one another, and
the damping behavior of the device is adjusted by varying the at least one variably adjustable stiffness.

21. A method of use of the device according to claim 20, wherein:
the variably adjustable damping behavior of the device corresponds to damping behavior of an elastomer so that the damping behavior with a predefinable damping and a varying oscillation frequency of the oscillating mounted body remains constant over a frequency range.

22. A method for influencing a mechanical coupling disposed in at least one force disposed between a resting body and an oscillating body with at least one variable adjustable stiffness coupling being disposed along the at least one force path, at least one variable adjustable stiffness being located in the at least one force path, comprising:
controlling the mechanical coupling with dynamic properties; and
exclusively varying the at least one stiffness along the at least one force path to exclusively variably influence damping properties of the at least one mechanical coupling.

* * * * *